United States Patent [19]

Danielian

[11] Patent Number: 5,021,929
[45] Date of Patent: Jun. 4, 1991

[54] FLASHLIGHT HAVING SECONDARY BEAM

[75] Inventor: Armen Danielian, Sherman Oaks, Calif.

[73] Assignee: Mattel, Inc., El Segundo, Calif.

[21] Appl. No.: 517,781

[22] Filed: Apr. 20, 1990

[51] Int. Cl.⁵ .............................................. F21V 7/04
[52] U.S. Cl. ...................................... 362/32; 362/204
[58] Field of Search .................. 362/32, 202, 204, 205

[56] References Cited

U.S. PATENT DOCUMENTS

| | | | |
|---|---|---|---|
| 2,016,794 | 10/1935 | Bade et al. | 362/32 |
| 2,760,185 | 8/1956 | Held . | |
| 2,777,121 | 1/1957 | Schon . | |
| 2,779,863 | 1/1957 | Ferman | 362/32 |
| 2,933,853 | 4/1960 | Laval | 362/32 |
| 3,924,115 | 6/1974 | Hampton et al. | 362/32 |
| 4,208,701 | 6/1980 | Schock | 362/202 |
| 4,364,104 | 12/1982 | Holahan et al. | 362/223 |
| 4,642,737 | 2/1987 | Meyers | 362/61 |
| 4,745,525 | 5/1988 | Sheehy | 362/32 |

Primary Examiner—Carroll B. Dority
Attorney, Agent, or Firm—Roy A. Ekstrand

[57] ABSTRACT

A battery powered flashlight includes a housing defining an interior cavity which supports an internal battery power source and flashlight bulb in operative communication with a movable switch also supported upon the housing. The housing further defines an opening and a generally parabolic reflector communicating the output light of the flashlight bulb to the housing opening. A simulated toy figure is joined to and appears to extend from the upper portion of the housing and supports a miniature replica of the flashlight. A curved light transmissive light pipe is coupled between the miniature light replica and the flashlight bulb in an optical coupling which permits a portion of the flashlight bulb output energy to be coupled through the light pipe and directed outwardly from the miniature flashlight to produce a secondary light beam. Movable colored filters are supported within the housing to permit coloration of the light beams.

8 Claims, 3 Drawing Sheets

FLASHLIGHT HAVING SECONDARY BEAM

FIELD OF THE INVENTION

This invention relates generally to flashlights and particularly to those providing a luminous toy capability.

BACKGROUND OF THE INVENTION

A great variety of battery powered light sources commonly known as flashlights have been created to meet a wide ranging group of needs and demands. While the structures of such flashlights vary substantially with intended use, all generally include a housing defining an interior cavity which supports one or more battery power sources and an electric light bulb together with appropriate interconnecting conductive wires. In most flashlights, a reflector is positioned relative to the electric bulb and is operative to direct substantially all of the light outwardly from the housing through a lens or opening provided therein. Most flashlights include a switch arrangement which permits the interruption of power to the flashlight bulb to conserve battery power. In some flashlights, a time duration operative automatic off-switch is also included which interrupts the power to the bulb once the flashlight remains operative for a predetermined period of time.

A frequently added feature of flashlights intended to have some secondary use such as amusement is the provision of one or more color filters which are movable to and from positions overlying the flashlight bulb to alter the color of light transmitted therefrom. Often mechanisms are provided which permit the insertion of different filters from a selection of filters movably supported within the flashlight housing.

Through the years, various attempts have been made to enhance and improve the enjoyment or entertainment value afforded by such flashlights. Flashlight manufacturers have provided flashlights of different shapes and sizes often in colorful housings and the like to make flashlights interesting and entertaining as well as useful.

U.S. Pat. No. 2,777,121 issued to Schon sets forth MULTI-COLORED FLASHLIGHTS in which a generally conventional elongated cylindrical flashlight includes a battery power source and electric bulb and a generally parabolic reflector which cooperate to produce a light beam. A plurality of colored light filters are adapted to be supported within the flashlight beam and alter the color of light produced by the flashlight.

U.S. Pat. No. 4,208,701 issued to Schock sets forth a LUMINOUS TOY having a light source including an internal battery power source, an electric bulb and a reflector supports an elongated hollow member formed of a translucent material. The elongated translucent member extends from the reflector portion of the flashlight and receives the light output therefrom. An elongated sinuous strip of light reflecting material is supported within the elongated hollow translucent member to reflect the light therein and produce a variety of light patterns on the translucent material.

U.S. Pat. No. 4,364,104 issued to Holahan sets forth a NOVELTY LIGHT in which a foldable light toy is provided having an appearance similar to a pocket knife. An elongated handle housing supports a pivotally secured extensible element which is made of a light conveying material. A lamp within the pivotal member is coupled to a battery source together with a switch mechanism which causes the extended illuminatable element to be illuminated in the open position.

U.S. Pat. No. 2,760,185 issued to Held sets forth a SIGNALING DEVICE in which an elongated tubular flashlight housing supports a battery power source, a flashlight bulb and a generally conical reflector. The housing further defines an output opening which in turn supports a signaling unit having a generally planar member supporting an elongated cylindrical rod of light transmissive material. When the light is turned on, the light output is directed to the cylindrical element to provide an illuminated member. Additional illuminatable members having different shapes and configurations are equipped with attachable bases to be alternatively secured to the flashlight.

U.S. Pat. No. 4,642,737 issued to Meyers, Jr. sets forth a MOTOR VEHICLE HEADLIGHT INDICATOR in which a suction cup is attached to one end of a light conveying conduit and is securable to the headlight of a motor vehicle. The remaining end of the light transmissive conduit is positioned within the field of view of the motor vehicle operator to indicate the illumination of the headlight.

U.S. Pat. No. 4,745,525 issued to Sheehy sets forth a LIGHT TAILGATE FOR PICK-UP TRUCK in which a plurality of fiber optic lighting elements are supported within a pick-up truck tailgate such that one end of each is directed to an aperture in the outer surface of the truck tailgate. The remaining ends of the light transmissive elements are exposed to a light source with the effect that the tailgate elements are illuminated by the light source.

While the foregoing described lighting units have provided some measure of utility and amusement, there remains a continuing need in the art for an ever increasing number of improved, efficient and cost effective flashlights having an amusement character.

SUMMARY OF THE INVENTION

Accordingly, it is a general object of the present invention to provide an improved flashlight. It is a more particular object of the present invention to provide an improved flashlight having an enhanced entertainment or amusement value associated therewith.

In accordance with the present invention, there is provided a flashlight comprises: a housing having an interior cavity and first light output opening; a reflector supported within the housing having an open side directed toward the first output opening: a light bulb supported within the reflector; a battery power source operatively coupled to the light bulb for causing it to emit light; a figure extending from the housing defining a second light output opening and an internal passage between the second light output opening and the interior cavity; and passive light coupling means for receiving a portion of the light produced by the light bulb and coupling it to the second light output opening to produce a secondary light beam.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjuction with the accompanying drawings, in the several figures of which like reference numerals identify like elements and in which:

DESCRIPTION OF THE PREFERRED EMBODIMENT

Figure 1:
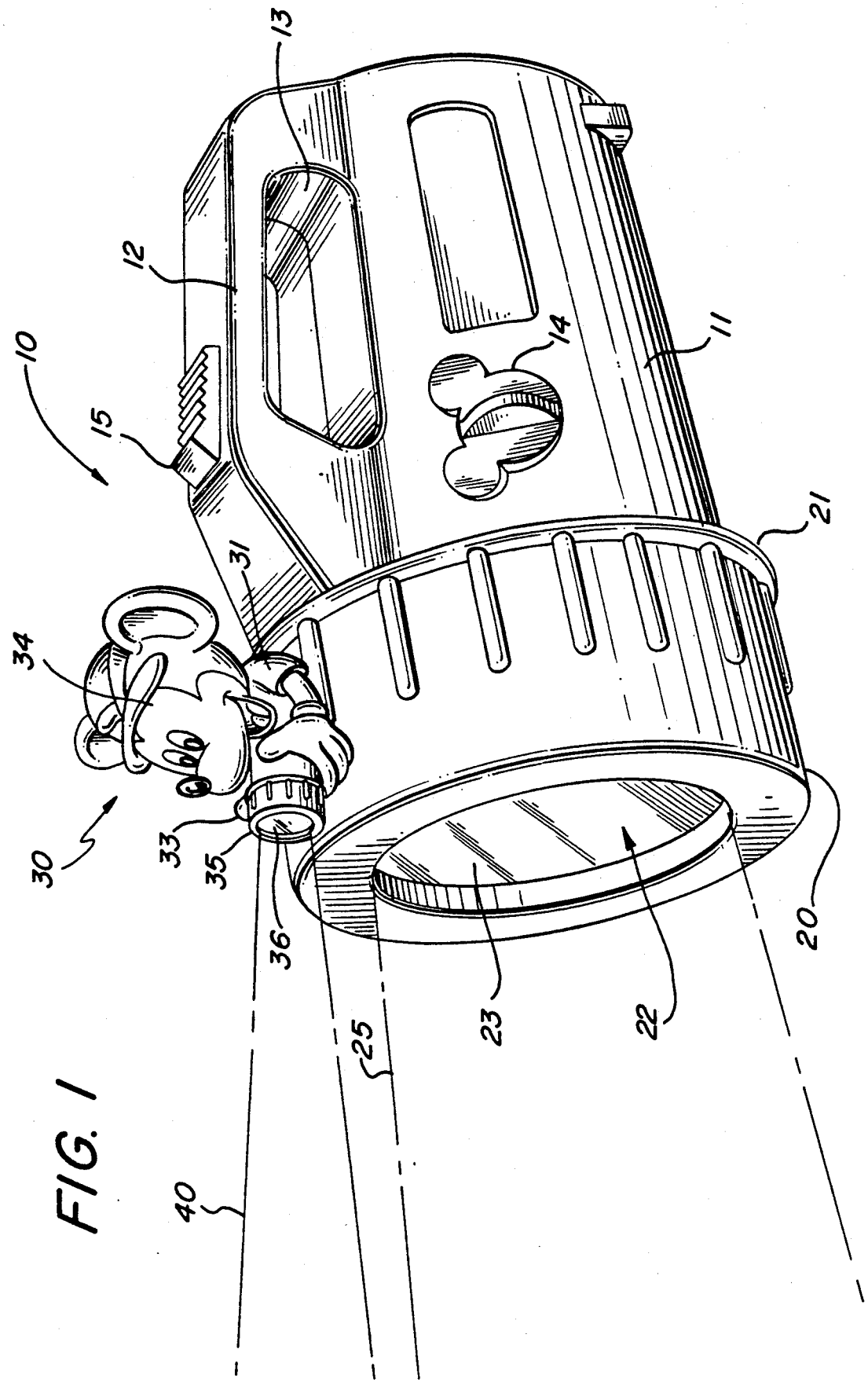
FIG. 1 sets forth a perspective view of a flashlight constructed in accordance with the present invention.

FIG. 1 sets forth a perspective view of a flashlight constructed in accordance with the present invention and generally referenced by numeral 10. Flashlight 10 includes a generally cylindrical housing 11 defining an extending angle loop 12 and a handle opening 13 therebetween. A filter knob 14 is rotatably secured to housing 11 and is used to operate a pair of color filters 50 and 51 (seen in FIG. 2). A conventional power switch 15 is supported upon handle 12 and is operable to emanate the illumination of flashlight 10. Flashlight 10 further includes a generally cylindrical lens support housing 20 having an annular rim 21 which in accordance with conventional fabrication techniques is secured to housing 11. Lens support 20 further defines an upwardly extending toy figure 30 which replicates a cartoon character and which includes a body 31 extending from the upper portion of lens support 20, a head portion 34 and a pair of extending hands 32 and 33. A miniature light 35 configured to duplicate flashlight 10 is supported between hands 32 and 33 and defines an opening 36. Lens support 20 further defines a circular opening 22 which supports a front lens 23. In accordance with the operation set forth below, the manipulation of power switch 15 energizes flashlight 10 and causes a primary light beam 25 to be directed outwardly from housing 11 and lens support 20 through front lens 23 and opening 22. Concurrently and in accordance with the present invention, the energizing of flashlight 10 produces a secondary light beam 40 which shines outwardly from miniature light 35 through opening 36. In further accordance with the present invention, the manipulation of filter knob 14 to insert either of filters 50 or 51 into primary light beam 25 to produce a color change therein produces a simultaneous color change in secondary light beam 40.

Thus, flashlight 10 is operative in response to manipulation of power switch 15 to produce a standard primary light beam 25 and a secondary light beam 40 which appears to emanate outwardly from miniature light 35 held by toy figure 30.

Figure 2:
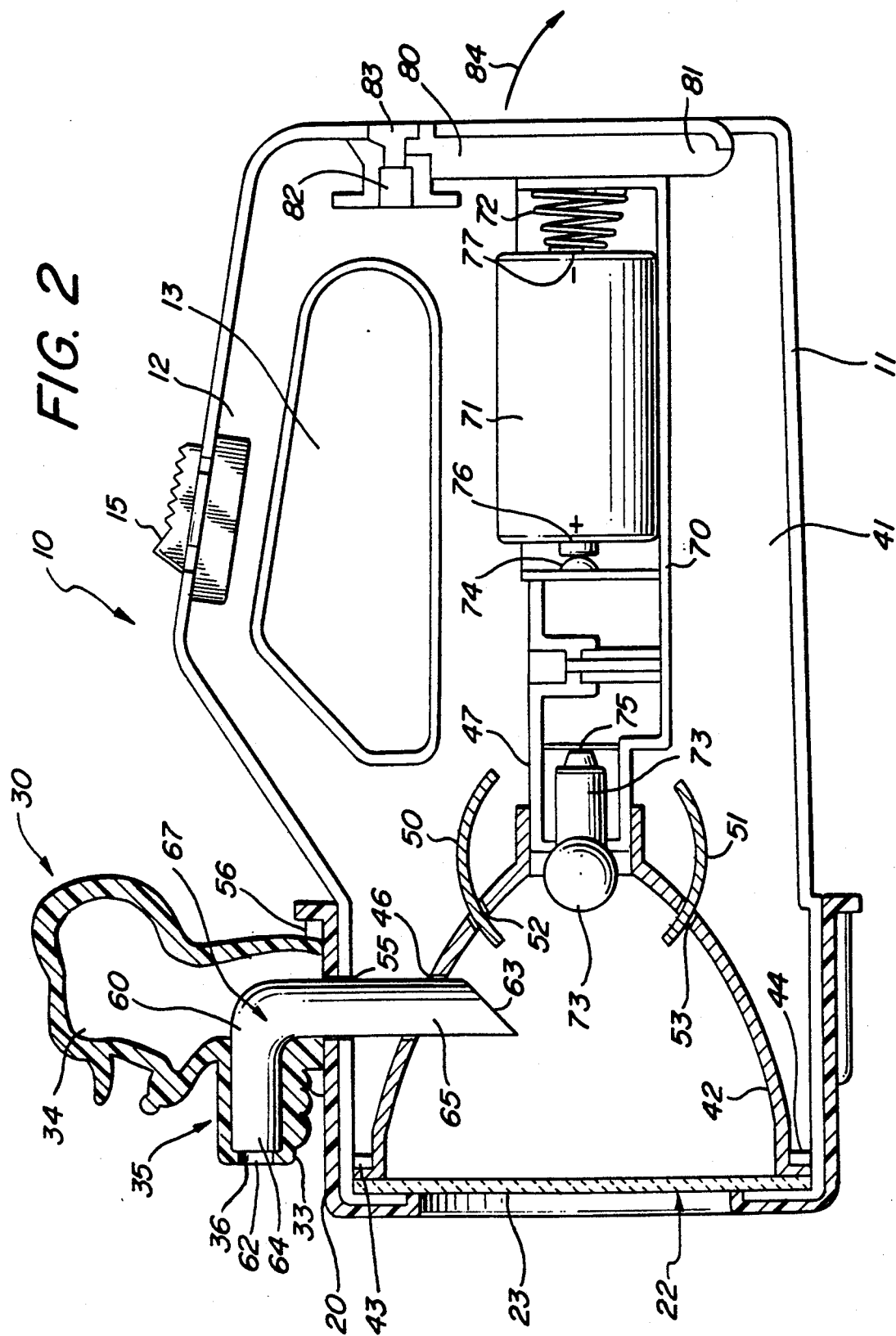
FIG. 2 sets forth a section view of the present invention flashlight taken along section lines 2—2 in FIG. 3.
Figure 3:
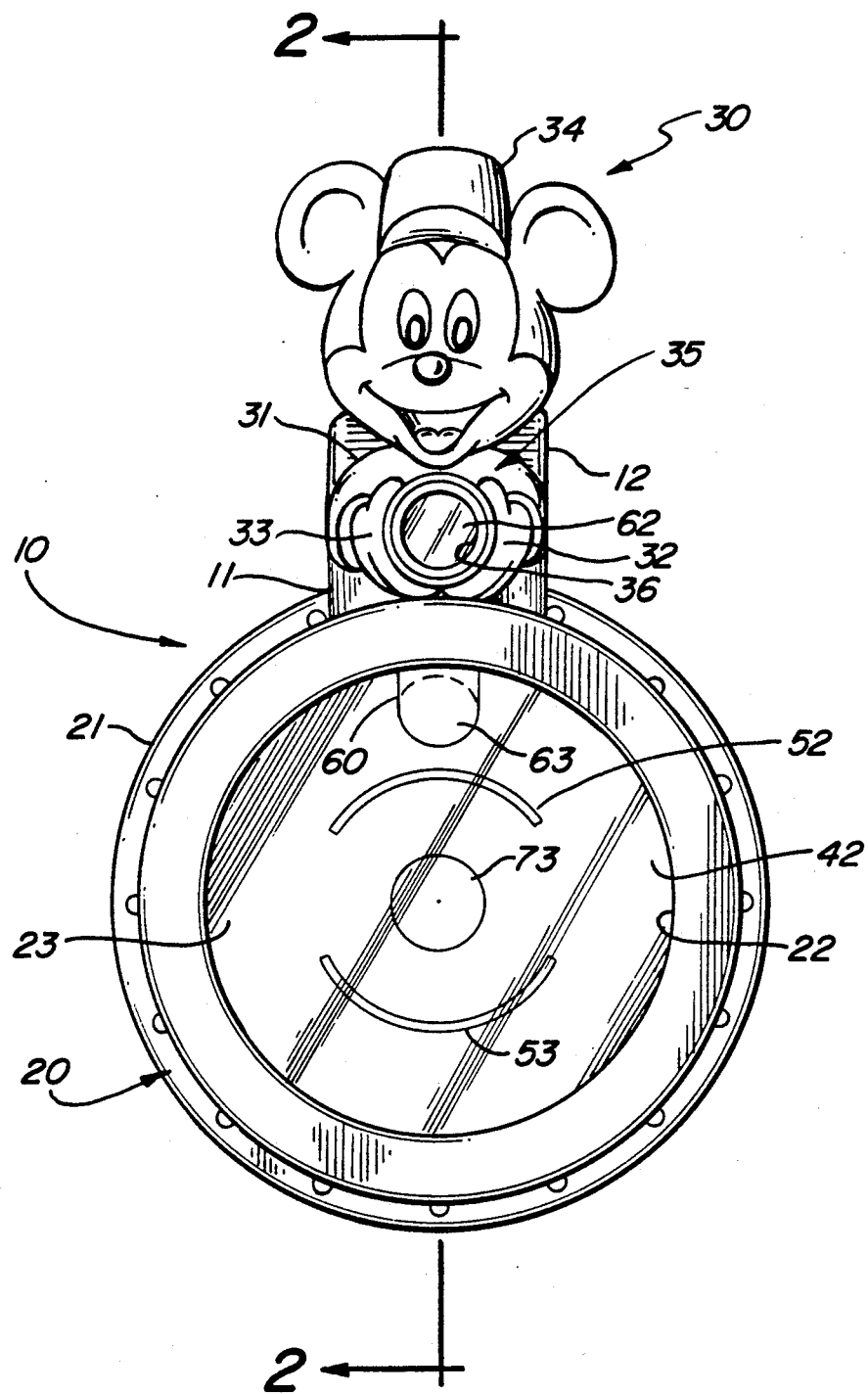
FIG. 3 sets forth a front view of a flashlight constructed in accordance with the present invention.

FIG. 2 sets forth a section view of flashlight 10 taken along section lines 2—2 in FIG. 3. Flashlight 10 includes a housing 11 defining an interior cavity 41, a handle portion 12 and a handle opening 13. Housing 11 further defines a generally planar battery door 80 having a pivotal attachment 81 within interior cavity 41. Battery door 80 is pivotable from the closed position shown in FIG. 2 to an open position exposing interior cavity 41 by rotation about pivot 81 in the direction indicated by arrow 84. A latch mechanism is operative upon battery door 80 and includes a fastener 83, a support portion 85 and a fastener 82. Fasteners 83 and 82 cooperate to secure battery door 80. A lens support 20 defines a generally cylindrical member secured to the front portion of housing 11 and defining an opening 22. Lens support 20 further supports a generally planar front lens 23. Lens support 20 further defines an upwardly extending aperture 55 and a pedestal 56. A toy figure 30 which, as mentioned above, is fabricated to replicate a cartoon figure includes a body portion 31 joined to pedestal 56, a head portion 34 and a hand 33. A miniature light replica 35 is continuous with toy figure 30 and defines an interior passage 37.

A generally parabolic reflector 42 fabricated of a light reflective material defines an outwardly extending rim 43 which is captivated between rib 44 of housing 11 and lens 23 to provide secure support therefor. Reflector 42 further defines an aperture 46 which in its preferred form is vertically aligned with aperture 55 in lens support 20 and pedestal 56. Reflector 42 further defines a generally cylindrical opening 45.

An elongated battery case 70 extends from and is supported at one end by battery door 80. Battery case 70 is further supported at the other end by extension 47 thereof which is received within bulb opening 45 of reflector 42. In accordance with conventional fabrication techniques, a battery 71 having a positive contact 76 and a negative contact 77 is supported within battery case 70. A spring 72 forces contact 76 of battery 71 against contact 74 of battery case 70. Spring 72 also provides electrical connection to negative contact 77 of battery 71. A flashlight bulb 73 constructed in accordance with conventional fabrication techniques is received and supported within extension 47 of battery case 70. A contact 75 on bulb 73 provides electrical connection between battery 71 and bulb 73. A pair of generally spherical colored filter elements 50 and 51 are movably supported on either side of bulb 50 and extends through slots 52 and 53 defined in reflector 42. While not shown in FIG. 2, it will be apparent to those skilled in the art that colored filters 50 and 51 are movable between the retracted positions shown in FIG. 2 to the extended positions shown in dashed line representation in FIG. 2. In the extended position, filters 50 and 51 provide a change in the colored light reflected outwardly through opening 22 by lens 42. Lenses 50 and 51 may be supported in accordance with conventional fabrication techniques which are not shown here for purposes of clarity.

A light transmissive pipe 60 having a generally circular cross section and a general L-shape defines a curved portion 61 and straight portions 64 and 65. Straight portion 64 extends through interior passage 37 of toy figure 30 and defines a generally flat output surface 62. Output surface 62 is aligned with opening 36 of miniature light 35. Straight portion 65 of light pipe 60 extends downwardly through aperture 46 in reflector 42 and defines an angled input surface 63. Input surface 63 is angled to provide a maximum light absorption from bulb 73.

A power switch 15 is movably supported upon handle 12 and includes appropriate electrical connections (not shown) to battery 71 and bulb 73 to permit power switch 15 to operate to complete the electrical circuit between battery 71 and bulb 73 or alternatively to interrupt it in order to terminate the light output of bulb 73.

In operation, switch 15 is actuated to complete the circuit between battery 71 and bulb 73 causing bulb 73 to be energized and produce visible light. The light output from bulb 73 is directed by the reflective surface of reflector 42 outwardly through opening 22 and lens 23. Concurrently, a portion of the light output of bulb 73 is incident upon input surface 63 of light pipe 60. Because of the transmissive character of the material from which light pipe 60 is fabricated, a substantial portion of the incident light upon input surface 63 is transmitted internally to straight surface 65. The light conductive characteristics of light pipe 60 cause the transmitted light within straight portion 65 to be curved at curve 61 and transmitted through straight portion 64 and outwardly from output surface 62. As a result, a portion of the light produced by bulb 73 is received by light pipe 60 and directed outwardly through opening 36 of miniature light 35. In accordance with an important aspect of the invention, secondary light beam 40 is produced without the use of additional power from battery 71. Thus, the light output of miniature light 35 does not in any way reduce or shorten battery life.

In addition with a further advantage of the present invention, the positioning of either colored filters 50 or 51 in the extended position to color primary light beam 25 produces a corresponding coloring of the light received at input surface 63 at light pipe 60. Accordingly, secondary light beam 40 assumes the same color as primary light beam 25. Once again, in accordance with an important aspect of the present invention, secondary light beam 40 is colored without the use of additional filters or additional complexity of mechanical linkage in supporting filters 50 and 51.

FIG. 3 sets forth a front view of the present invention flashlight generally referenced by numeral 10. Flashlight 10 includes a housing 11 having an upwardly extending handle 12. A generally cylindrical lens support 20 defines an outwardly extending rim 21 and a circular lens opening 22. A generally planar front lens 23 is supported within opening 22 of lens support 20. A toy figure 30 replicating a cartoon character includes a body portion 31 joined to and continuous with lens support 20. Toy figure 30 further includes a head 34 and a pair of hands 32 and 33. A miniature flashlight 35 is supported between hands 32 and 33. Miniature flashlight 35 defines an opening 36 which receives output surface 62 of light pipe 60. Light pipe 60 extends downwardly into the interior of lens support 20 and terminates in an angled surface 63. A conventional light bulb 73 is supported at the center of opening 22 and is surrounded by a reflector 42. Reflector 42 further defines a pair of curved slots 52 and 53 which, as is better seen in FIG. 2, receive colored filters 50 and 51.

While the present invention flashlight having secondary beam has been shown and described in a cylindrical or circular format, it will be apparent to those skilled in the art that other shapes and configurations may be utilized without departing from the spirit and scope of the present invention. By way of further variation, it will be equally apparent to those skilled in the art that while a cartoon figure has been shown supporting and surrounding the miniature light through the which the secondary flashlight beam is transmitted, other supporting figures and characters may be utilized without departing from the spirit and scope of the present invention.

While particular embodiments of the invention have been shown and described, it will be obvious to those skilled in the art that changes and modifications may be made without departing from the invention in its broader aspects. Therefore the aim in the appended claims is to cover all such changes and modifications as fall within the true spirit and scope of the invention.

That which is claimed is:

1. A flashlight comprising:
    a housing having an interior cavity and first light output opening;
    a reflector supported within said housing having an open side directed toward said first output opening;
    a light bulb supported within said reflector;
    a battery power source operatively coupled to said light bulb for causing it to emit light;
    a figure extending from said housing defining a second light output opening and an internal passage between said second light output opening and said interior cavity; and
    passive light coupling means for receiving a portion of the light produced by said light bulb and coupling it to said second light output opening to produce a secondary light beam.

2. A flashlight as set forth in claim 1 wherein said reflector defines an aperture and wherein said light coupling means extends therethrough.

3. A flashlight as set forth in claim 2 wherein said light coupling means includes a light transmissive light pipe having an input end directed toward said light bulb and an output end directed toward said second light output opening.

4. A flashlight as set forth in claim 3 wherein said light pipe is generally L-shaped.

5. A flashlight as set forth in claim 4 wherein said input end of said light pipe is generally cylindrical and defines a major axis and an input surface angled with respect thereto.

6. A flashlight as set forth in claim 3 wherein said figure replicates the upper portion of a creature holding a miniature flashlight.

7. A flashlight as set forth in claim 6 in which said creature is a cartoon-like animal.

8. A flashlight as set forth in claim 3 further including a movable colored filter for coloring the light transmitted through said first and second light output openings.

* * * * *